United States Patent
Hwang

[11] Patent Number: 5,992,673
[45] Date of Patent: Nov. 30, 1999

[54] REUSABLE PRODUCE CRATE

[75] Inventor: Philip C. Hwang, Manhattan Beach, Calif.

[73] Assignee: Rehrig Pacific Company, Los Angeles, Calif.

[21] Appl. No.: 08/840,244

[22] Filed: Apr. 17, 1997

[51] Int. Cl.$^6$ .................................................. B65D 43/02
[52] U.S. Cl. .................... 220/333; 220/332; 220/334; 220/255; 206/508; 206/518
[58] Field of Search .................... 206/508, 518, 206/519; 220/334, 332, 333, 329, 908, 259, 255

[56] References Cited

U.S. PATENT DOCUMENTS

| | | | |
|---|---|---|---|
| 4,143,695 | 3/1979 | Hoehn | 220/334 |
| 4,412,616 | 11/1983 | Williams | 220/329 |
| 4,685,567 | 8/1987 | Webb | 206/518 |
| 4,765,480 | 8/1988 | Malmanger | 206/508 |
| 5,088,616 | 2/1992 | Susko et al. | 220/908 |
| 5,253,758 | 10/1993 | Bissell, II | 206/518 |
| 5,392,915 | 2/1995 | Kalin | 206/54 |
| 5,415,293 | 5/1995 | Ackermann et al. | 206/506 |
| 5,555,996 | 9/1996 | Lang-Ree et al. | 330/403 |
| 5,673,791 | 10/1997 | Jamison | 220/333 |

*Primary Examiner*—Stephen J. Castellano
*Attorney, Agent, or Firm*—Brooks & Kushman P.C.

[57] ABSTRACT

A container for housing produce comprising a generally rectangular bottom, generally rectangular opposed first and second side and end walls extending upwardly and outwardly from the bottom, and a pivot member on an upper edge of the first side wall. A lid comprising two panels is provided, each panel having first and second side edges and a hinge edge, the first side edges being detachably and pivotally secured to the pivot member. A hinge operatively connects the hinge edges of the two panels. Resilient flanges are provided on the second side edges of the panels to releasably engage shoulders formed on an upper edge of the second side wall when the lid is closed. To nest multiple containers one within another, the lid is removed from the side wall, folded 180° about its hinge, rotated 90° and placed in the bottom of the container. Another container is then placed in the container and the process is repeated.

25 Claims, 6 Drawing Sheets

REUSABLE PRODUCE CRATE

INTRODUCTION

The present invention is directed to a reusable produce crate, and, more particularly, to a reusable produce crate having a detachable lid with an internal hinge formed such that the lid can be folded in half and stored in the bottom of the crate.

BACKGROUND

Crates for housing produce are well known in the industry. Such crates, or containers, typically comprise a bottom, opposed end and side walls, and a lid. The lids of the containers may be hinged to a side wall of the container or may be detached lids which are placed on the container when in use. It is desirable to minimize the space required for storing the containers. Cone method of storing such containers to conserve space is to stack them in a nesting manner one within another. When containers with detached lids are stacked in such a manner the lids must be removed in order to allow the containers to properly nest. The lids therefore are prone to being misplaced and present additional storage and handling problems. Containers with hinged lids may not have enough clearance when the lids are opened to be able to nest containers, and the hinged lids may present other problems when attempting to nest containers.

U.S. Pat. No. 5,555,996 to Lang-Ree et. al. shows a container with a split lid, each section of the lid being hinged to an upper edge of a side wall of the container. When nesting multiple containers of this type, the lids remain hinged to the side walls and hang down along outer surfaces of the side walls which increases the floor space required to store the containers.

U.S. Pat. No. 5,392,915 to Kalin shows a container having a detached lid which is mountable at several locations along the side walls of the container. The lid of this container cannot be stored in the bottom of the container when multiple containers are nested.

U.S. Pat. No. 5,415,293 to Ackerman et. al. shows a container having a detached lid which also cannot be stored in the bottom of the container.

It is an object of the present invention to provide a reusable produce crate which reduces or wholly overcomes some or all of the aforesaid difficulties inherent in prior known devices. Particular objects and advantages of the invention will be apparent to those skilled in the art, that is, those who are knowledgeable and experienced in this field of technology, in view of the following disclosure of the invention and detailed description of certain preferred embodiments.

SUMMARY

The principles of the invention may be used to advantage to provide a reusable produce crate or container having a detachably hinged lid, the lid having an internal hinge which allows the lid to be folded in half and stored on the bottom of the container. Multiple containers can then be stacked in a nesting manner while ensuring that their associated lids are stored with the containers.

In accordance with a first aspect, a container comprises a generally rectangular bottom, generally rectangular opposed first and second side and end walls extending upwardly and outwardly from the bottom, and a pivot member on an upper edge of the first side wall. A lid comprising two panels is provided, each panel having first and second side edges and a hinge edge, the first side edges being detachably and pivotally secured to the pivot member. A hinge operatively connects the hinge edges of the two panels to one another.

In accordance with another aspect, resilient flanges are provided on the second side edges of the panels to positively engage shoulders formed on an upper edge of the second side wall when the lid is closed.

To nest multiple containers one within another, in accordance with certain preferred embodiments, the lid is removed from the side wall, folded 180° about its hinge, rotated 90°, and placed in the bottom of the container. Another container is then placed in the container, its lid is removed in a similar manner, and the process is repeated for each successive container which is to be nested in a stack of containers.

Substantial advantage is achieved by providing a reusable produce container having such a detachable hinged lid. Since the lids are stored within the containers when multiple containers are stacked in a nesting fashion, the potential for losing lids is reduced. The ability to nest the containers along with their lids also improves the handling of the containers as well as reducing the space required to store the containers, thereby reducing costs.

From the foregoing disclosure, it will be readily apparent to those skilled in the art, that is, those who are knowledgeable or experienced in this area of technology, that the present invention provides a significant technological advance. Preferred embodiments of the reusable produce container of the present invention can provide improved handling, a reduction in the space required to store containers, and reduction in potential for lost lids. These and additional features and advantages of the invention disclosed here will be further understood from the following detailed disclosure of certain preferred embodiments.

BRIEF DESCRIPTION OF THE DRAWINGS

Certain preferred embodiments are described in detail below with reference to the appended drawings wherein.

The figures referred to above are not drawn necessarily to scale and should be understood to present a simplified representation of the invention, illustrative of the basic principles involved. Some features of the reusable produce container depicted in the drawings have been enlarged or distorted relative to others to facilitate explanation and understanding. The same reference numbers are used in the drawings for similar or identical components and features shown in various alternative embodiments. Reusable produce containers as disclosed above, will have configurations and components determined, in part, by the intended application and environment in which they are used.

DETAILED DESCRIPTION OF CERTAIN PREFERRED EMBODIMENTS

Figure 1:
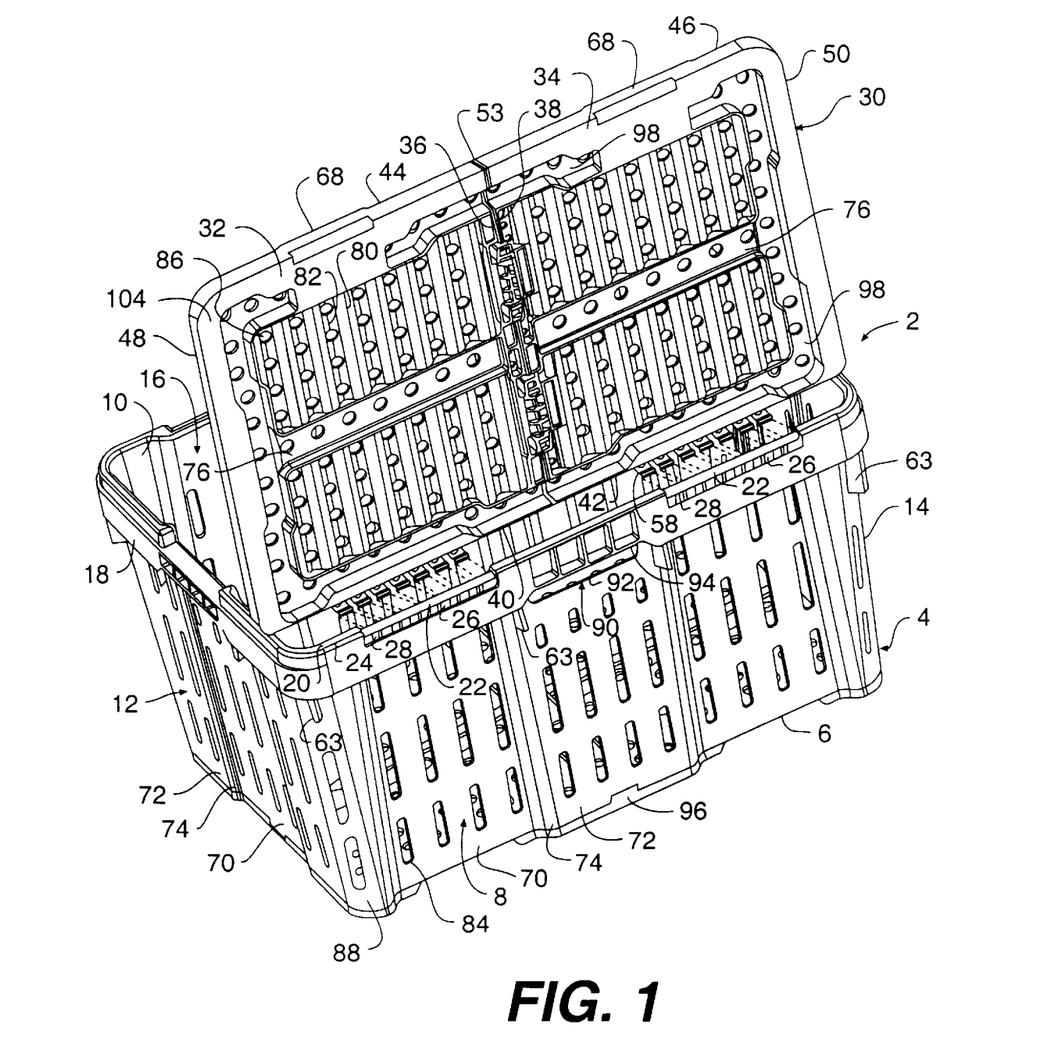
FIG. 1 is a schematic perspective view of a container of the present invention shown with the lid detached from the container body.

Turning now to FIG. 1, a preferred embodiment of the reusable produce crate or container 2 will be described in more detail. Container 2 may be formed by molding a high density plastic material, such as polyethylene, or the like. Container 2 comprises container body 4 formed of bottom 6, upstanding from which are upwardly and outwardly inclined opposed first and second side walls 8, 10 and opposed first and second end walls 12, 14 forming a rectangular top opening 16. Extending about the upper edges of the container walls and defining the top opening 16 is a lip 18 which imparts a rigidifying effect to the walls. The exterior face of lip 18 extends vertically, as contrasted with the inclination of the walls, and terminates in an upwardly facing, generally horizontal rim surface 20. Reinforcing the container body walls in this manner, not only strengthens the structure, but, due to the vertical orientation of the lip, enables the container walls to resist the application of lateral forces that occur during palletizing of the container. A pivot member comprising a pair of pivot pins 22 is formed along an upper edge 24 of first side wall 8. A plurality of slots 26 are formed along pivot pins 22 by legs 28 which are spaced along and interconnect pivot pins 22 and first side wall 8. Pivot pins 22 and legs 28 are preferably formed of one-piece construction with first side wall 8.

Figure 2:
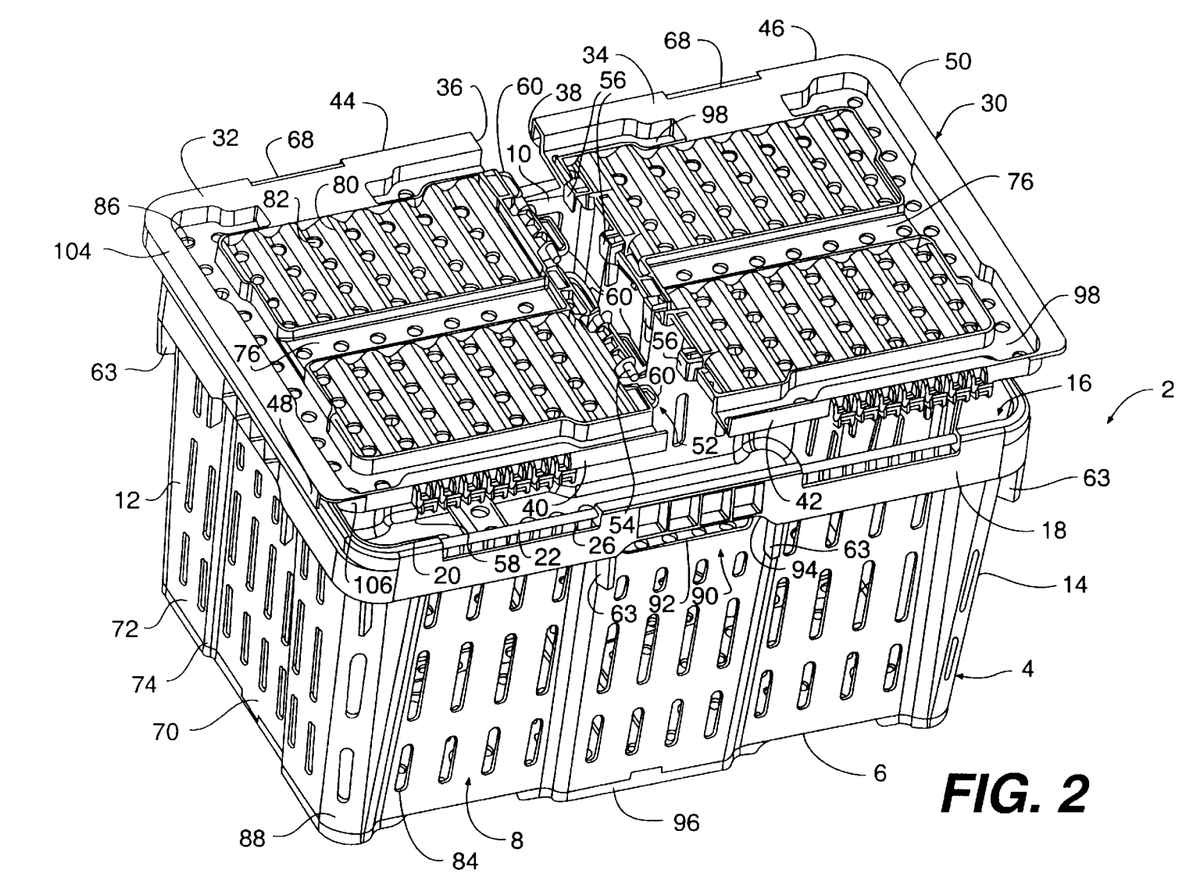
FIG. 2 is a schematic perspective view of the container of FIG. 1 shown with the panels of the lid in a preassembled condition.

Lid 30 is comprised of first and second panels 32, 34. First panel 32 is formed with hinge edge 36, first side edge 40, second side edge 44, and end edge 48. Second panel 34 is formed with hinge edge 38, first side edge 42, second side edge 46, and end edge 50. Hinge edges 36, 38 are pivotally secured to one another by hinge 52 with gap 53 provided between hinge edges 36, 38 when they are so secured. The construction of hinge 52 along with gap 53 allows lid 30 to be folded a full 180° about hinge 52. As seen in FIG. 2, hinge 52 comprises hinge pins 54 which are formed along hinge edge 36 of first panel 32, and pin housings 56 which are downwardly opening pockets formed along hinge edge 38 of second panel 34. Hinge 52 is typically assembled soon after lid 30 is molded and therefore still warm. Hinge pins 54 are snapped into their respective pin housings 56 with the application of slight pressure. Thereafter, when lid 30 has cooled, hinge pins 54 are positively retained within pin housings 56 such that a large force is necessary to separate them. Hinge pins 54 are preferably formed of one-piece construction with first panel 32, while pin housings 56 are preferably formed of one-piece construction with second panel 34. Such one-piece construction reduces manufacturing costs and complexity.

A plurality of fingers 58, having a generally arcuate profile, extend along first side edges 40, 42 of first and second panels 32, 34, respectively, as seen in FIG. 2. When lid 30 is attached to container body 4, fingers 58 extend outwardly through slots 26 and wrap at least partially around pivot pins 22, thereby providing a hinging action between lid 30 and container body 4, as shown by the dashed lines in FIG. 1. Fingers 58 are preferably formed of one piece construction with first and second panels 32, 34. When container body 4 is filled with produce, such as spinach for example, it is often overstuffed beyond the upper edges of the walls of the container body. Since pivot pins 22 act as fulcrums about which lid 30 rotates, leverage is thereby provided which allows lid 30 to compress the produce contained within the container 2 as lid 30 is closed, as seen in FIG. 3.

Figure 4:
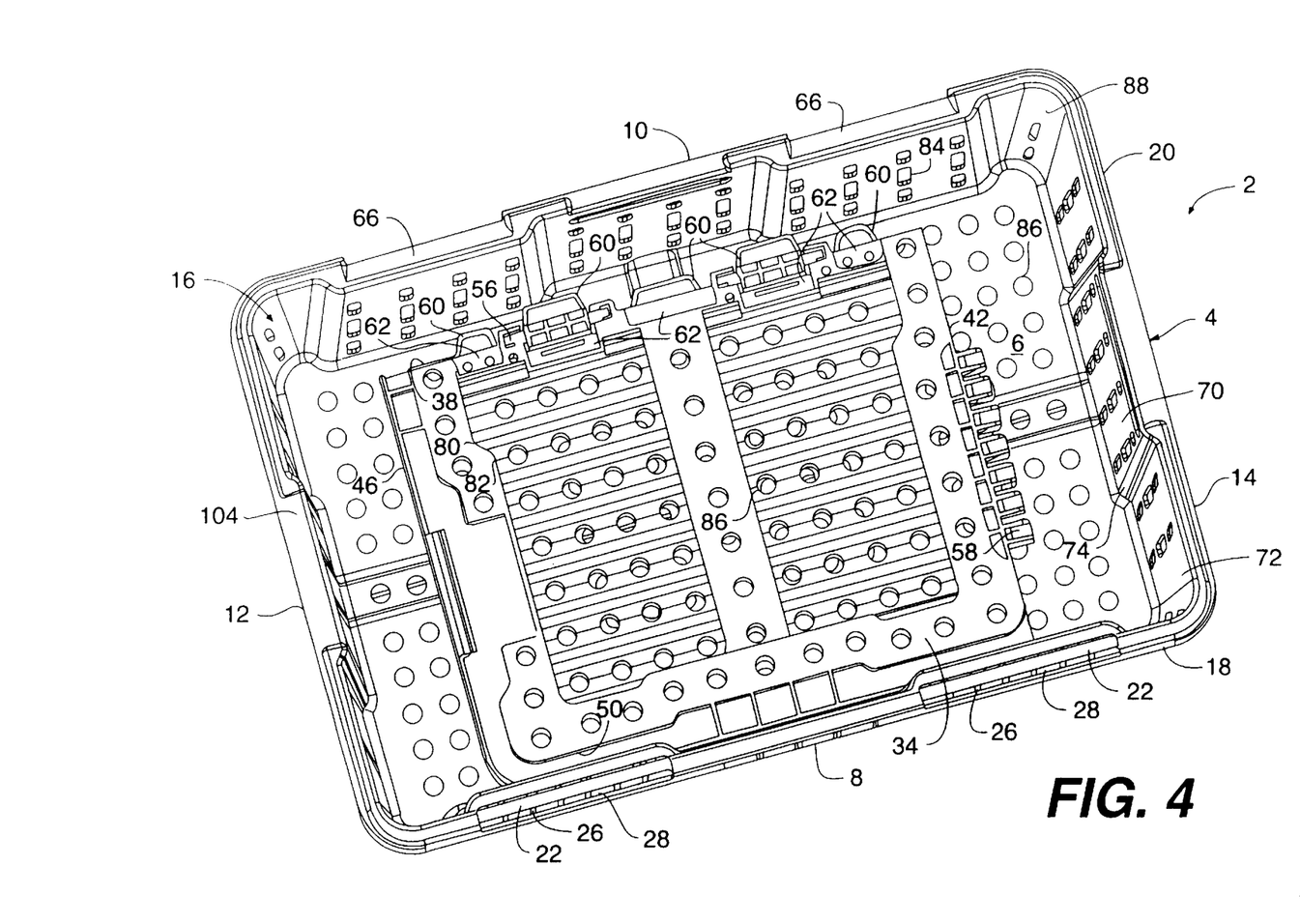
FIG. 4 is a schematic plan view of the container of the present invention with the lid folded about its hinge, rotated 90°, and stored on the bottom of the container.

Tabs 60 project from hinge edge 36 of first panel 32, as seen in FIG. 2. Recesses 62 are formed on an undersurface of second panel 34, as seen in FIG. 4. When first and second panels 32, 34 are attached via hinge 52, tabs 60 extend beyond opposed hinge edge 38 and below second panel 34, and mate with corresponding recesses 62. The engagement of tabs 60 and recesses 62 prevents the pivoting of first and second panels 23, 34 downwardly about hinge 52. First and second panels can therefore only be rotated in one direction, namely upward, about hinge 52. Thus, when container 2 is filled with produce beyond the upper edges of container body 4, lid 4 can be closed with a force sufficient to compress the produce, yet without concern that the lid will collapse as it would if first and second panels 32, 34 were allowed to pivot downwardly about hinge 52. Tabs 60 therefore advantageously increase the rigidity of lid 30 and allow it to act as a one-piece lid when attached to container body 4. Tabs 60 are preferably formed of one piece construction with first panel 32.

Figure 5:
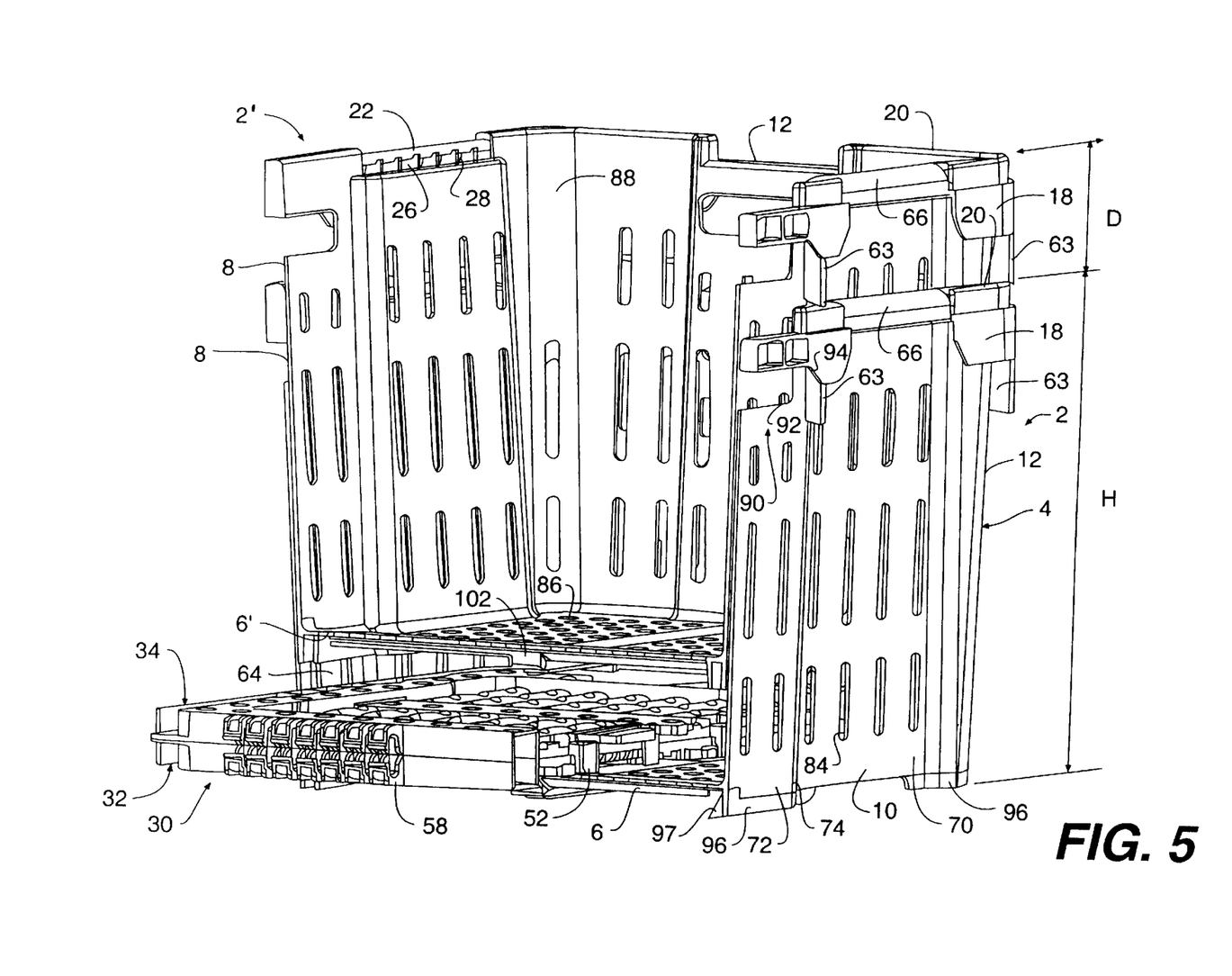
FIG. 5 is a schematic perspective view, shown partially cut away, of a pair of containers nested within one another, with the lid of the first of the containers stored on the bottom of the first container beneath the second container.

An advantage of the present invention is that multiple containers can be stacked along with their lids in a nesting fashion. To nest multiple containers, when empty, one into another, lid 30 must first be removed from container body 4. This is accomplished by rotating lid 30 upward from container body 4, as seen in FIG. 3, and pulling lid 30 away from first side wall 8. As lid 30 is pulled, fingers 58 are unseated from around pivot pins 22 and pulled free from slots 26 to the position shown in FIG. 1. Lid 30 is then folded in half by rotating one of first and second panels 32, 24 a full 180° about hinge 52. Alternatively, each of first and second panels 32, 34 could be partially rotated about hinge 52 such that upper surfaces of first and second panels 32, 34 butt against one another. Folded lid 30 is then held such that the planes of the surfaces of first and second panels 32, 34 are substantially parallel to bottom 6, and then rotated 90° such that hinge edges 36, 38 and end edges 48, 50 are now parallel to first and second side walls 8, 10. Lid 30 is then placed on bottom 6 of container 2, as seen in FIG. 4. A second container 2' is then placed inside of container 2 as seen in FIG. 5. A plurality of supports 63 comprising flanges extend downwardly from lip 18 around the periphery of container 2. When container 2' is placed inside container 2, rim surface 20 of container 2 butts up against a lower surface of each support 63 of container 2'. The engagement of supports 63 and rim surface 20 prevents containers which are stacked in this manner from being tightly wedged together and difficult to separate. Due to the tapered walls of the containers 2, 2' and the interaction of rim surface 20 with supports 63, the containers are allowed to nest within one another such that a gap 64 is formed between the undersurface of bottom 6' of the upper container 2' and the top surface of bottom 6 of container 2. Lid 30, which has been placed on bottom 6 of container 2 thereby is situated within gap 64. Additional containers can be stacked on top of containers 2, 2' in such a nesting fashion with their lids stored in the corresponding gaps formed between the bottoms of the containers. The lids are advantageously kept with the containers when they are stacked and stored in this manner. In a preferred embodiment, containers 2 are dimensioned such that they nest in a ratio of about 4:1. That is, when container 2' nests within container 2, the height H of container 2 is about four (4) times the distance D which container 2' projects above rim surface 20 of container 2. A higher nesting ratio minimizes the vertical space required to store stacked containers and is therefore a desired advantage. Since lid 30 is folded a full 180°, its profile when folded in half is minimized, thereby minimizing gap 64 within which lid 30 fits and increasing the nesting ratio.

Figure 3:
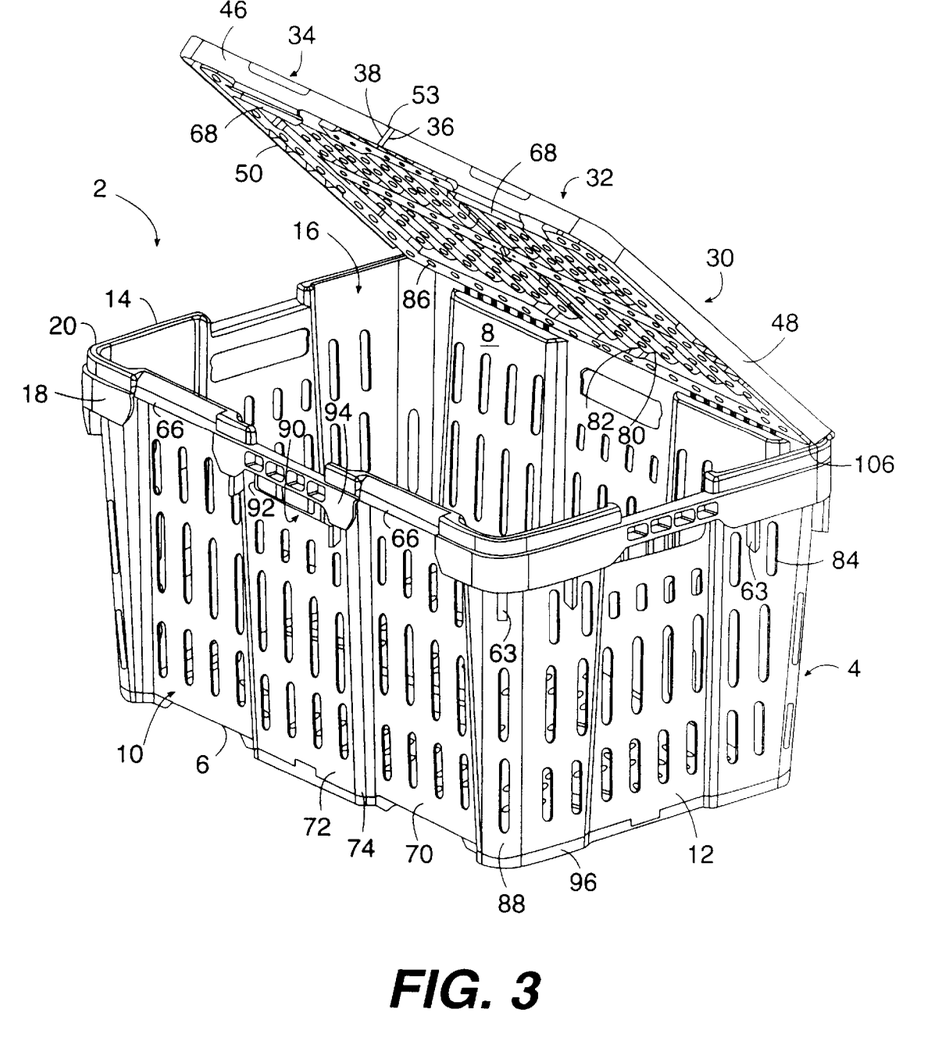
FIG. 3 is a schematic perspective view of the container of FIG. 1 with the lid attached to the container body and in a partially open position.

In a preferred embodiment, shoulders 66 are provided along an upper edge of second side wall 16, as seen in FIG. 3. Fasteners, for example flanges 68, are provided along second edges 44, 46 of lid 30 and are formed to engage shoulders 66 as lid 30 is closed on container body 4. Flanges 68 are resilient members which flex outwardly past shoulders 66 as lid 30 is closed and then return to their original position, thereby securely and positively retaining lid 30 on container body 4. To open container 2, flanges 68 are grasped and pulled outwardly and upwardly past shoulders 66, allowing lid 30 to be raised.

First and second side walls 8, 10 and first and second end walls 12, 14 are, in certain preferred embodiments, formed of alternating recessed and projecting portions 70, 72 which are joined by shoulders 74. This non planar construction of the walls of container 2 advantageously adds to the rigidity of container 2.

First and second panels 32, 34 are formed with longitudinal channels 76, extending from end edges 48, 50, respectively to hinge edges 36, 38, respectively, as seen in FIG. 1. Longitudinal channels 76 are formed to receive longitudinal ribs 102, formed on the undersurface of bottom 6 of another container stacked on top of container 2, and which are described below in detail in reference to FIG. 6. The external surfaces of first and second panels 32, 34 contain alternating transverse ridges 80 and transverse channels 82, seen in FIG. 2, which provide added rigidity to lid 30.

Ventilation is needed within and around container 2 since fresh produce is typically housed within container 2. Additionally, drainage is needed both when containers are filled with produce and when they are empty and stacked in a nesting manner. Slots 84 are formed in side walls 8, 10, end walls 12, 14, and corners 88, which are formed by the intersections of the container walls, in order to provide ventilation and or drainage for the contents of container 2. Holes 86 are formed in lid 30 and bottom 6 to provide additional ventilation and or drainage for container 2. Holes 86 in lid work to ventilate container 2 when full, and act to drain it when empty since lid 30 rests on bottom 6 of container 2 when empty containers are stacked. Slots 84 and holes 86 may have any shape that provides sufficient ventilation and or drainage for container 2. Corners 88 are rounded to provide space between adjoining containers when multiple containers are stored abutting one another. The spaces formed between adjacent containers by the inclined walls and the rounded corner construction of the containers allows air to flow around the containers as well as ice to be packed within these spaces to provide additional cooling.

In a preferred embodiment handles 90 are formed proximate central upper edges of first and second side walls 8, 10 and first and second end walls, 12, 14. Handles 90 are usually formed as apertures; 92 in the respective walls and recesses 94 formed along lip 18 of container body 4 proximate the upper edges thereof. Handles 90 provide added rigidity to container body 4 and ease handling of the container 2.

Figure 6:
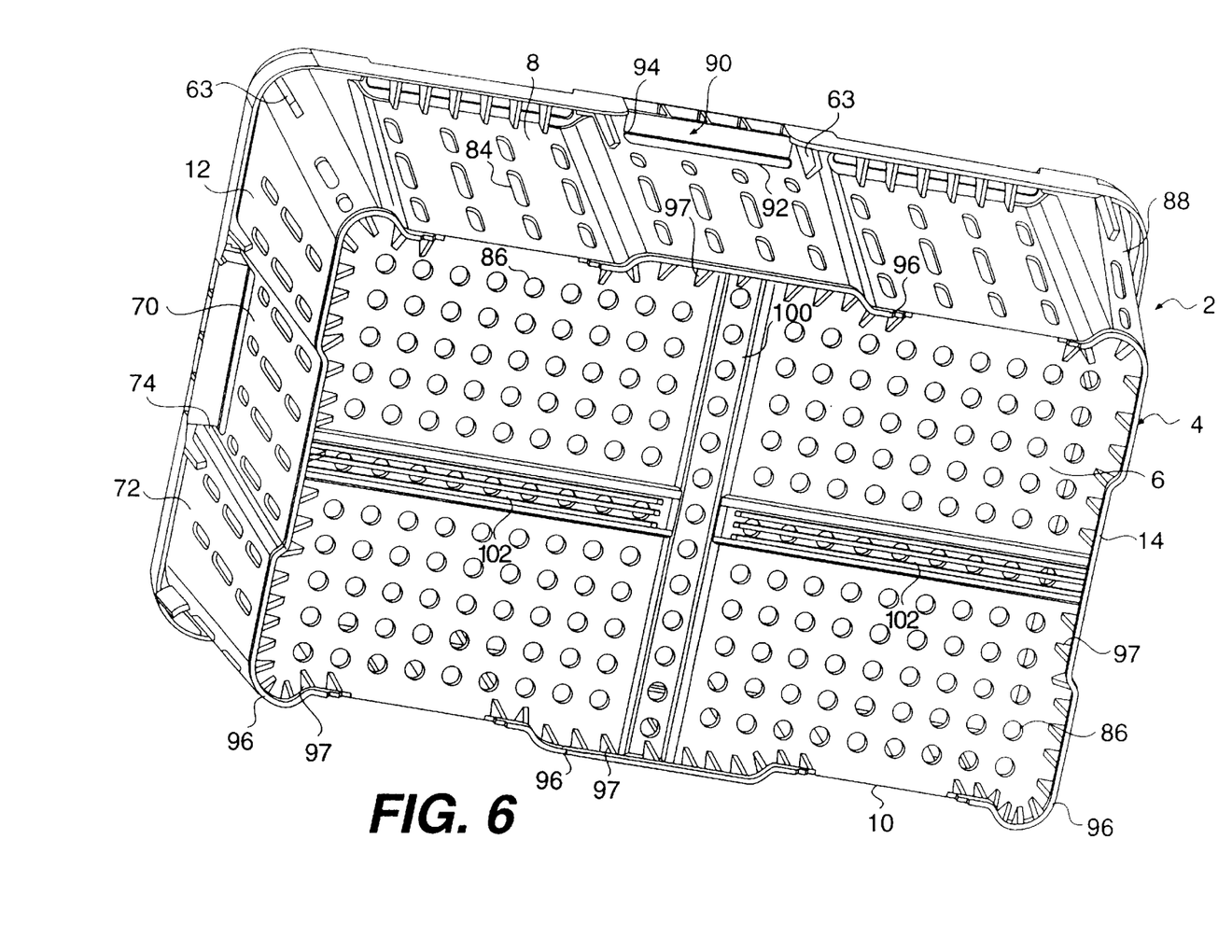
FIG. 6 is a schematic perspective view of the container of FIG. 1 showing the bottom of the container.

The underside of the container bottom 6 may, as shown in FIG. 6, be provided with feet 96 which are disposed along the outer perimeter of bottom 6. Feet 96 are supported by braces or gussets 97 which are preferably triangular shaped members which extend between feet 96 and bottom 6. Feet 96 cooperate with recesses 98 disposed along and proximate the outer edges of lid 30, as seen in FIG. 1. The cooperation of feet 96 and recesses 98 increases the stability of containers which are stacked with their lids attached. Transverse channel 100 extends from first side wall 8 to second side wall 10 of bottom 6 and is formed to receive a hinge 52 when the container 2 is stacked on top of another container which has its lid attached. Longitudinal ribs 102 extend from first end wall 12 to transverse channel 100 and from second end wall 14 to transverse channel 100 along a central portion of bottom 6, similarly engaging with longitudinal channel 76 in lid 30 of another container, and provides added rigidity for container 2. The interaction of transverse channel 100 with hinge 52 and the interaction of longitudinal ribs 102 with longitudinal channels 76 also increases the stability of containers which are stacked with their lids attached.

Apron 104 is formed about the perimeter of lid 30 and comprises a double-walled member forming channel 106, seen in FIG. 2, which receives lip 18 of container body 4 thereby positively engaging lid 30 when container 2 is closed. Apron 104 additionally adds rigidity to container 2.

In light of the foregoing disclosure of the invention and description of certain preferred embodiments, those who are skilled in this area of technology will readily understand that various modifications and adaptations can be made without departing from the true scope and spirit of the invention. All such modifications and adaptations are intended to be covered by the following claims.

I claim:

1. A lid for use with a container for housing produce, the container having a generally rectangular bottom, generally rectangular opposed first and second side and end walls extending upwardly from the bottom, and a pivot member on an upper edge of the first side wall, the lid comprising in combination:

first and second panels, each panel having first and second side edges and a hinge edge; an attachment member on each of the first side edges for detachably and pivotally securing the first and second panels to a pivot member on an upper edge of a first side wall of a container; and a hinge extending along the hinge edges of each of the two pieces to operatively connect the two panels of the lid.

2. A lid in accordance with claim 1 wherein the hinge comprises at least one pivot pin formed along the hinge edge of the first panel and at least one pin housing formed along the hinge edge of the second panel, each pin housing adapted to receive a corresponding pivot pin to operatively connect the first and second panels.

3. A lid in accordance with claim 1 further comprising a fastener on the second side edge adapted to releasably engage the second side wall of the container when the lid of the container is in a closed position.

4. A lid in accordance with claim 3 wherein the fastener comprises at least one resilient flange.

5. A lid in accordance with claim 1 further comprising at least one tab projecting from the hinge edge of at least one of the panels, and at least one recess formed on at least the other of the two panels, each tab extending beyond the hinge edge of the other of the two panels when the two panels are operatively connected to engage a corresponding recess and prevent rotation of the hinge in one direction beyond a point where the two panels of the lid are in substantially the same plane.

6. A lid in accordance with claim 1 wherein each attachment member comprises a plurality of fingers formed on the first side edge to detachably and pivotally secure the lid to the pivot member.

7. A container for housing produce, comprising in combination:

a generally rectangular bottom:
   generally rectangular opposed first and second side and end walls extending upwardly from the bottom;
   a pivot member on an upper edge of the first side wall;
   a lid comprising first and second panels, each panel having first and second side edges and a hinge edge, the first side edges detachably and pivotally secured to the pivot member; and
   a hinge extending along the hinge edges of each of the two panels to operatively connect the two panels of the lid.

8. A container in accordance with claim 7 wherein the hinge comprises at least one pivot pin formed along the hinge edge of the first panel and at least one pin housing formed along the hinge edge of the second panel, each pin housing adapted to receive a corresponding pivot pin to operably connect the first and second panels.

9. A container in accordance with claim 7 wherein the pivot member comprises a pair of pivot pins fixedly secured to the first side wall.

10. A container in accordance with claim 9 wherein the pivot member further comprises a plurality of legs spaced along and interconnecting the pivot pins and the first wall.

11. A container in accordance with claim 9 further comprising a plurality of fingers formed on the first side edge to detachably and pivotally secure the lid to the pivot pins.

12. A container in accordance with claim 7 wherein the pivot member is formed of one-piece construction with the first wall.

13. A container in accordance with claim 7 further comprising a fastener on the second side edge and a shoulder on the second side wall, the fastener adapted to releasably engage the shoulder when the lid of the container is in a closed position.

14. A container in accordance with claim 13 wherein the fastener comprises at least one resilient flange.

15. A container in accordance with claim 7 further comprising a plurality of supports extending along upper portions of the side and end walls, wherein the end walls and side walls are tapered upwardly and outwardly from the bottom and a space is formed between an upper surface of the bottom of the container and a lower surface of the bottom of a second container when the second container is nested within the container by engagement of the supports of the second container with upper surfaces of the side and end walls of the container.

16. A container in accordance with claim 15 wherein the container and the second container are nested in a ratio of about 4 to 1.

17. A container in accordance with claim 7 wherein corners formed by the intersection of the end and side walls are substantially rounded.

18. A container in accordance with claim 7 further comprising:
   at least one foot formed on a lower surface of the bottom;
   at least one recess formed in an upper surface of the lid, the recess adapted to receive the at least one foot of a second container stacked upon the container when the lid of the container is closed.

19. A container in accordance with claim 7 further comprising at least one tab projecting from the hinge edge of at least one of the panels, and at least one recess formed on at least the other of the two panels, each tab extending beyond the hinge edge of the other of the two panels when the two panels are operatively connected to engage a corresponding recess and prevent rotation of the hinge in one direction beyond a point where the two panels of the lid are in substantially the same plane.

20. A container in accordance with claim 7 further comprising an apron formed along the side and end edges of the lid, the apron having a double wall construction.

21. A container in accordance with claim 7 wherein a plurality of apertures is formed in at least one of the bottom, the lid, the end walls, the side walls, and corners formed by the intersection of the side and end walls to ventilate the container.

22. A container for housing produce, comprising in combination:
   a generally rectangular bottom:
      generally rectangular opposed first and second side and end walls extending upwardly from the bottom;
      a pivot member on an upper edge of the first side wall;
      a lid comprising first and second panels, the lid having first and second side edges, the first side edge detachably and pivotally secured to the pivot member;
      a hinge extending from the first side edge to the second side edge of the lid to operatively connect the two panels of the lid;
      a shoulder on an upper edge of the second side wall; and
      a fastener on the second side edge, the fastener formed to releasably engage the shoulder.

23. A container in accordance with claim 22 wherein the hinge comprises at least one pivot pin formed along a hinge edge of the first panel and at least one pin housing formed along a hinge edge of the second panel, each pin housing adapted to receive a corresponding pivot pin to operatively connect the first and second panels.

24. A container in accordance with claim 22 wherein the pivot member comprises a pair of pivot pins fixedly secured to the first side wall.

25. A container in accordance with claim 22 further comprising a plurality of fingers formed on the first side edge to detachably and pivotally secure the lid to the pivot pins.

* * * * *

UNITED STATES PATENT AND TRADEMARK OFFICE
CERTIFICATE OF CORRECTION

PATENT NO. : 5,992,673
DATED : November 30, 1999
INVENTOR(S) : Philip C. Hwang

It is certified that error appears in the above-identified patent and that said Letters Patent is hereby corrected as shown below:

Column 6, claim 1,
Line 33, delete "in combination".
Line 38, delete "a" and insert -- the --.
Line 40, delete "pieces" and insert -- panels --.

Column 6, claim 7,
Lines 67-68, delete "in combination".

Column 8, claim 22,
Lines 24-25, delete "in combination".

Signed and Sealed this

Twentieth Day of November, 2001

*Attest:*

*Nicholas P. Godici*

NICHOLAS P. GODICI
*Attesting Officer* *Acting Director of the United States Patent and Trademark Office*